(12) United States Patent
Van de Goot

(10) Patent No.: US 6,238,768 B1
(45) Date of Patent: May 29, 2001

(54) ANTIBALLISTIC SHAPED PART

(75) Inventor: Ernst L. Van de Goot, Sittard (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/219,360

(22) Filed: Dec. 23, 1998

Related U.S. Application Data

(63) Continuation of application No. PCT/NL97/00349, filed on Jun. 23, 1997.

(30) Foreign Application Priority Data

Jun. 24, 1996 (NL) .................................................... 1003405

(51) Int. Cl.$^7$ ...................................................... B32B 5/12
(52) U.S. Cl. .......................... 428/113; 428/221; 428/156; 428/170; 428/171; 428/172; 428/295.1
(58) Field of Search ..................................... 428/156, 284, 428/195, 170, 171, 172, 232, 294.7, 295, 911, 113, 295.4, 295.1, 221

(56) References Cited

U.S. PATENT DOCUMENTS

| | | | |
|---|---|---|---|
| 4,623,574 | * 11/1986 | Harpell et al. | 428/113 |
| 5,061,545 | * 10/1991 | Li et al. | 428/195 |
| 5,175,040 | * 12/1992 | Harpell et al. | 428/113 |
| 5,332,613 | * 7/1994 | Taylor et al. | 428/152 |

FOREIGN PATENT DOCUMENTS

| | | |
|---|---|---|
| 89/01125 | 2/1989 | (WO) . |
| 95/00318 | 1/1995 | (WO) . |

* cited by examiner

*Primary Examiner*—Merrick Dixon
(74) *Attorney, Agent, or Firm*—Pillsbury Madison & Sutro LLP

(57) ABSTRACT

The invention relates to an antiballistic shaped part composed of a stack of composite layers which layers are not linked to one another. Each composite layer having two or more monolayers of unidirectionally oriented fibers in a matrix. The fibers in each monolayer being at an angle to the fibers in an adjoining monolayer, and composed of poly(p-phenylenebenzobisoxazole. The composite layer containing at most 10% by weight of an elastomeric matrix material (calculated on the basis of the total weight of the composite layer), and having an areal density of at most 500 g/m$^2$. The fiber content in each monolayer being between 10 and 200 g/m$^2$. The invention also relates to method for fabricating said shaped part and body armour in which the shaped part is used.

14 Claims, No Drawings

ANTIBALLISTIC SHAPED PART

This is a Continuation International Appln. No. PCT/NL97/00349 filed Jun. 23, 1997 which designated the U.S.

The invention relates to an antiballistic shaped part comprising a stack of composite layers which are not linked to one another, each composite layer comprising two or more monolayers of unidirectionally oriented fibres in a matrix, the fibres in each monolayer being at an angle to the fibres in an adjoining monolayer. The invention also relates to a method for fabricating said shaped part and body armour in which the shaped part is used.

Such a shaped part is disclosed by WO 89/01125, which describes composite packets which are largely not linked to one another and contain high-performance polyethylene fibres and at least 10% by weight of polymeric matrix material.

The drawback of the shaped part from the prior art is that the ratio between energy absorption of the shaped part, which is a measure for the ballistic protection level, and the weight of the shaped part is unfavourable. This implies that a relatively heavy shaped part is required to achieve a certain required protection level. If the shaped part, on the other hand, does have a low weight, the shaped part provides a relatively low protection level against ballistic hits. For a large number of applications the lowest possible weight of the shaped part in conjunction with a certain required protection level is of great importance. This is the case, for example, in the field of personal protection, such as, for example, in clothing. Similarly, for applications in, for example, vehicles, the lowest possible weight for a certain required protection level is important.

The object of the invention is to provide an antiballistic shaped part which offers a higher protection level at a certain weight than the known shaped part.

This object is achieved according to the invention by the fibres being aramid fibres or poly(p-phenylenebenzobisoxazole) fibres, the composite layer containing at most 10% by weight of an elastomeric matrix material, each of the composite layers having a total weight of at most 800 g/m$^2$, and the fibre content in each monolayer being between 10 and 200 g/m$^2$.

A further advantage of the shaped part according to the invention is that, in addition to having a favourable ratio between the protection level and the areal density, the shaped part is flexible, the scope for applications of the shaped part in antiballistic articles being increased as a result. This makes the shaped part particularly suitable for applications where high flexibility is desirable, such as in body armour.

Antiballistic shaped parts are shaped parts which can be used in articles, for example protective clothing and armouring of vehicles, which offer protection against ballistic impacts such as by bullets and shrapnels.

The antiballistic shaped part according to the invention contains a stack of composite layers which are not linked to one another. A stack of composite layers which are not linked to one another cannot, however, be further processed as such, because it lacks any coherence required for further processing. To achieve this coherence the shaped part can, for example, be stitched through. As little of this is done as possible, however, for example only at the corners. Another possibility is to enclose the composite layers in a flexible cover. Thus the composite layers in the shaped part remain able to shift with respect to one another, whereas the shaped part in itself does have coherence.

A composite layer is a layer composed of two or more monolayers, each monolayer being at an angle to the adjoining, underlying monolayer, and the separate monolayers being linked to one another. The angle, which means the smallest angle enclosed by the fibres of the adjoining monolayers, is between 0° and 90°. Preferably, the angle is between 45° and 90°. Most preferably, the angle is between 80° and 90°. Shaped parts in which the fibres in the adjoining monolayers are at such an angle to one another have better antiballistic characteristics. The term monolayer refers to a layer of unidirectionally oriented fibres embedded in a matrix. The term fibre comprises not only a monofilament but, inter alia, also a multifilament yarn or flat tapes. The term unidirectionally oriented fibres refers to fibres which, in one plane, are essentially oriented in parallel.

The term matrix refers to a material which binds the fibres together and encloses the fibres in their entirety or in part. In addition to the elastomeric material the matrix may, if desired, contain the usual fillers for polymers or other substances. The matrix is homogeneously distributed over the entire surface of the monolayer.

It was found, surprisingly, that it is precisely as a result of the combination of aramid fibres or poly(p-phenylenebenzobisoxazole) fibres and a very low content of elastomeric matrix material, that a very high energy absorption in the event of a hit by a projectile, very high flexibility and good coherence of the composite layer in the antiballistic shaped part according to the invention are obtained. With a view to obtaining even higher energy absorption, the content of elastomeric matrix material in the composite layer is chosen to be as low as possible. Preferably, the elastomeric matrix material content of the composite layer in the antiballistic shaped part according to the invention is at most 7% by weight and more preferably at most 5% by weight. A certain minimum content (at least 1–2% by weight) of elastomeric matrix material must, however, be used to ensure that adequate fibre bonding is present in the composite layer, in order to provide the composite layer with adequate coherence.

Preferably, the elastomeric matrix material in the shaped part comprises a thermoplastic elastomer having a modulus in tension (determined in accordance with ASTM D638, at 25° C.) of less than 40 MPa. This makes the matrix material sufficiently elastic for the desired flexibility in the fibre-fibre bond in the monolayers and in the composite layers to be obtained. It was found that very good results are obtained if the elastomeric matrix material in the shaped part is a styrene-isoprene-sytrene block copolymer.

In a special embodiment of the invention, the matrix in the shaped part according to the invention also contains, in addition to the elastomeric matrix material, a filler in an amount of from 5 to 80% by volume, calculated on the basis of the total volume of the elastomeric matrix material and the filler. More preferably, the amount of filler is from 10 to 80% by volume and most preferably from 20 to 80% by volume. It was found that as a result, the flexibility of the shaped part increases without significant adverse effects on the antiballistic characteristics.

The fillers do not contribute to the bonding between the fibres, but serve for volumetric dilution of the matrix between the fibres, as a result of which the shaped part is more flexible and has a higher energy absorption. The filler preferably comprises a finely dispersed substance having a low weight or density. The filler may be a gas, although using a gas as a filler presents practical problems in processing the matrix material. The filler may also, inter alia, comprise the substances customary for preparing dispersions, such as emulsifiers, stabilizers, binders or a finely dispersed powder.

It was found that if the matrix contains an amount of filler below 80% by volume, the amount of elastomeric matrix material is sufficient to achieve adequate bonding between the fibres, with a constant total quantity of matrix material. It was also found that if the matrix contains a quantity of filler greater than 5% by volume, the flexibility of the shaped part increases.

Preferably, a separating layer is disposed on one or on both sides of the composite layer. The separating layer used may, for example, comprise Stamylex®, a linear low-density polyethylene.

This embodiment has the advantage that the flexibility of the shaped part is higher, and is preferable, in particular, if a tacky matrix material is used. A separating layer is a layer of a particular material which is placed between the composite layers, being optionally bonded thereto, and which ensures that the composite layers in the antiballistic shaped part remain separate from one another.

It was found that a shaped part combines high flexibility with good antiballistic characteristics if the composite layers of which the shaped part is made have a particular maximum total weight. Good ballistic characteristics have been found in shaped parts in which the composite layer has a total weight of at most 800 g/m$^2$. An antiballistic shaped part in which each composite layer has a total weight of less than 800 g/m$^2$ has adequate flexibility in combination with good antiballistic characteristics.

It was also found that the composite layer preferably has a total weight of at least 50 g/m$^2$. A lower total weight of the composite layer leads to unduly loose stacking of the composite layers in the shaped part, as a result of which coherence between the composite layers is inadequate.

Additionally it was found that the shaped part has good ballistic characteristics if the fibre content in each monolayer is between specific limits. Good ballistic characteristics have been found in a shaped part in which the fibre content of the monolayers is between 10 and 200 g/m$^2$. If the fibre content of the monolayer is smaller than 10 g/m$^2$, the coherence achieved in the monolayer is inadequate, and as a result the monolayer cannot be handled sufficiently well in practice to undergo further processing steps such as the shaping of a composite layer. If the fibre content in the monolayer is greater than 200 g/m$^2$, the shaped part is less flexible and the SEA is lower. By the specific energy absorption (SEA) is meant the value calculated by dividing the energy absorption EA by the areal density (AD) of the shaped part. It was found, moreover, that the shaped part has good antiballistic characteristics if the number of monolayers in the composite layers is as small as possible, given a specific total weight of the composite layer.

Further advantages of the antiballistic shaped part according to the invention are found in applications in which, in addition to the weight and the protection level of the shaped part, the flexibility plays an important part.

Antiballistic shaped parts can be employed both in permanently and in once-only flexible applications.

Permanently flexible applications refer to applications in which the shaped parts as a result of the use continuously undergo adjustments in shape, such as, for example, antiballistic shaped parts in body armour. Once-only flexible applications refer to applications in which the shaped parts are brought into a specific shape once only. An example of this is an antiballistic shaped part which is fitted in not readily accessible spaces such as the inside of car doors.

It was found that a suitable flexibility, protection level and weight of the shaped part is achieved if the total weight of the composite layers has a particular maximum value.

Preferably, the total weight of the composite layer in the shaped parts in a permanently flexible application is at most 500 g/m$^2$, the fibre content of each monolayer being between 10 and 150 g/m$^2$. More preferably, the total weight of the composite layer is at most 300 g/m$^2$, the fibre content of each monolayer being between 10 and 100 g/m$^2$.

Once-only flexible applications can make use of a shaped part which is composed of composite layers having a total weight of at most 800 g/m$^2$ and preferably greater than 300 g/m$^2$, because what is desirable in this once-only flexible application is precisely a certain minimum stiffness so that the applied shape is retained. More preferably, the total weight of the composite layers is greater than 400 g/m$^2$ and still more preferably greater than 500 g/m$^2$.

The antiballistic shaped part can, in principle, be fabricated by any known suitable methods, for example in accordance with WO-95/00318 or U.S. Pat. No. 4,623,574. A monolayer is produced, for example, by fibres, preferably in the form of continuous multifilament yarns, being guided from a bobbin frame across a comb, as a result of which they are oriented in parallel in a plane. Before or after being oriented in parallel in the plane, the fibres are coated with an amount of a liquid substance which contains the matrix material or contains a precursor which, in a later stage in the fabrication of the shaped part, reacts to give the polymer matrix material having the required modulus of elasticity. The term precursor refers to a monomer, an oligomer or a cross-linkable polymer. The liquid substance may be a solution, a dispersion or a melt.

A number of monolayers is laid crossways, preferably at an angle of about 90°, on top of one another, the composite layer being formed in the process. Preferably this is achieved by the temperature and/or the pressure being increased, the matrix material being able to flow between the fibres and being able to adhere to the fibres of the under- and/or overlying monolayers. If a solution or a dispersion of the matrix material is employed, the process of forming the monolayers into a composite layer also comprises the evaporation of the solvent or dispersant. Then the composite layers are stacked to produce a shaped part, with the option of a separating layer being applied to the composite layers or being interposed between the composite layers.

It was found that, with a view to obtaining the required low matrix content, it is very advantageous to use a method in which the monolayer is produced by aramid yarns having a count of yarn between 800 and 2500 denier being wetted with a dispersion of the elastomeric matrix material and the filler which may be present. Yarns having a count of yarn greater than 800 denier absorb comparatively little matrix material from the dispersion. Preferably, the count is greater than 1000 denier, more preferably greater than 1200 denier and most preferably greater than 1500 denier. The count of yarn is preferably lower than 2500 denier, because these can be spread more readily in the plane of the monolayer.

As specified above, the dispersion preferably contains elastomeric material and fillers in a weight ratio of from 20:80 to 95:5. It was found that as a result a very uniform distribution of the matrix is obtained for a very low matrix material content.

Preferably, an aqueous dispersion is used. An aqueous dispersion has a low viscosity, which has the advantage that the matrix material is very uniformly distributed over the fibres, good, homogeneous fibre—fibre bonding being achieved as a result. A further advantage is that the dispersant water is nontoxic and can therefore be evaporated in the open air. Preferably, the dispersion, likewise with a view to obtaining a uniform distribution at the low matrix percentage aimed for, contains between 30 and 60% by weight of solid components (elastomeric matrix material and any filler present), relative to the total weight of the dispersion.

The antiballistic shaped part according to the invention, obtainable according to the method specified above, preferably has an SEA of at least 190 Jm²/kg when struck by a bullet of type FMJ 9 mm (8 grams). The energy absorption (EA) upon impact of a bullet or a shrapnel is calculated from the kinetic energy of a bullet or shrapnel of velocity $V_{50}$. The $V_{50}$ is the velocity at which the probability of the bullets or shrapnels penetrating through the ballistic structure is 50%.

The invention is explained by means of the following examples, without being limited thereto, however.

EXAMPLE I

A monolayer was produced by Twaron 2000® yarns having a count of 1680 dtex being guided from a bobbin frame over a comb and wetting them with an aqueous dispersion of the matrix material Kraton® D1107. The yarns were oriented in parallel in a plane, the yarn weight of the monolayer being 50.4 g/m². The composite layer was produced by crosswise stacking of 4 monolayers and applying a Stamylex® separating layer and consolidating the monolayers and the separating layer a pressure of 0.5 MPa and at a temperature of 90° C. The total weight of the composite layer was 252 g/m². The composite layer contained 8.0% by weight of elastomeric material and 3.5% by weight of fillers (based on the total weight of the composite layer).

A flat shaped part was fabricated from a loose, nonlinked stack of 15 composite layers, the shaped part being stitched through at the corners. Upon impact of a bullet type 9 mm FMJ (8 g) the $V_{50}$ was 430 m/s and the SEA was 195 Jm²/kg.

EXAMPLE II

A monolayer was produced by Twaron 2000® yarns having a count of 1680 dtex being guided from a bobbin frame over a comb and wetting them with an aqueous dispersion of the matrix material Kraton® D1107. The yarns were oriented in parallel in a plane, the yarn weight of the monolayer being 50.4 g/m². The composite layer was produced by crosswise stacking of 4 monolayers and applying a Stamylex® separating layer and consolidating the monolayers and the separating layer under a pressure of 0.5 MPa and at a temperature of 90° C. The total weight of the composite layer was 236 g/m². The composite layer contained 3.7% by weight of elastomeric material and 1.6% by weight of fillers (based on the total weight of the composite layer).

A flat shaped part was fabricated from a loose, nonlinked stack of 11 composite layers, the shaped part being stitched through at the corners. Upon impact of a bullet type 9 mm FMJ (8 g) the $V_{50}$ was 375 m/s and the SEA was 220 Jm²/kg.

COMPARATIVE EXAMPLE A

A monolayer was produced by Twaron 2000® yarns having a count of 1680 dtex being guided from a bobbin frame over a comb and wetting them with an aqueous dispersion of the matrix material Kraton® D1107. The yarns were oriented in parallel in a plane, the yarn weight of the monolayer being 50.4 g/m². The composite layer was produced by crosswise stacking of 4 monolayers and applying a Stamylex® separating layer and consolidating the monolayers and the separating layer under a pressure of 0.5 MPa and at a temperature of 90° C. The total weight of the composite layer was 236 g/m². The composite layer contained 20% by weight of elastomeric material and 5.0% by weight of fillers (based on the total weight of the composite layer).

A flat shaped part was fabricated from a loose, nonlinked stack of 15 composite layers, the shaped part being stitched through at the corners. Upon impact of a bullet type 9 mm FMJ (8 g) the $V_{50}$ was 431 m/s and the SEA was 176 Jm²/kg.

The flexibility of the flat shaped part was significantly lower than the flexibility of the flat shaped part from Example I.

What is claimed is:

1. Antiballistic shaped part comprising a stack of composite layers which are not linked to one another, each composite layer comprising two or more monolayers of unidirectionally oriented fibres in a matrix, the fibres in each monolayer being at an angle to the fibres in an adjoining monolayer, wherein the fibres are aramid fibres or poly(p-phenylenebenzobisoxazole) fibres, the composite layer contains at most 10% by weight of an elastomeric matrix material calculated on the basis of the total weight of the composite layer, the composite layer has an areal density of at most 500 g/m², and the fibre content in each monolayer is between 10 and 200 g/m².

2. Antiballistic shaped part according to claim 1, wherein the composite layer contains at most 7% by weight of the elastomeric matrix material.

3. Antiballistic shaped part according to claim 1, wherein the composite layer contains at most 5% by weight of the elastomeric matrix material.

4. Antiballistic shaped part according to any of claims 1–3, wherein the matrix in addition to the elastomeric matrix material also contains a filler in an amount of from 5 to 80% by volume, calculated on the basis of the total volume of the elastomeric matrix material and the filler.

5. Antiballistic shaped part according to claim 4, wherein the matrix contains from 20 to 80% by volume of filler.

6. Antiballistic shaped part according to claim 5, wherein the elastomeric matrix material is a thermoplastic elastomer having a modulus in tension at 25° C. of less than 40 MPa.

7. Antiballistic shaped part according to claim 5, wherein the elastomeric matrix material is a styrene-isoprene-styrene block copolymer.

8. Antiballistic shaped part according to claim 5, wherein disposed on one or both sides of each composite layer there is a separating layer.

9. Body armour comprising an antiballistic shaped part according to claim 5, wherein the composite layer has a total weight of at most 500 g/m², and the fibre content in each monolayer is between 10 and 150 g/m².

10. Body armour according to claim 9, wherein the composite layer has a total weight of at most 300 g/m², and the fibre content in each monolayer is between 10 and 100 g/m².

11. Method for fabricating an antiballistic shaped part according to claim 1, wherein the monolayer is produced by aramid yarns having a count of yarn between 800 and 2500 denier being wetted with a dispersion of the elastomeric matrix material and the filler which may be present.

12. Method according to claim 11, wherein the dispersion contains between 30 and 60% by weight of elastomeric matrix material and any filler which may be present based on the total weight dispersion.

13. Antiballistic shaped part obtainable in accordance with the method of claim 11 or 12.

14. Antiballistic shaped part according to claim 5 wherein the shaped part has a specific energy absorption of at least 190 Jm²/kg when struck by 9 mm full metal jacket 8 gram bullet.

* * * * *